United States Patent [19]

Jinbo et al.

[11] Patent Number: 5,568,031
[45] Date of Patent: Oct. 22, 1996

[54] APPARATUS AND METHOD FOR CONTROLLING A DRIVING MOTOR

[75] Inventors: Noriyuki Jinbo, Toyohashi; Akira Takasu, Toyokawa, both of Japan

[73] Assignee: Minolta Co., Ltd., Osaka, Japan

[21] Appl. No.: 493,164

[22] Filed: Jun. 21, 1995

[30] Foreign Application Priority Data

Jul. 7, 1994 [JP] Japan .................................. 6-155705

[51] Int. Cl.⁶ .................................................. G05B 19/416
[52] U.S. Cl. ........................... 318/630; 318/15; 318/362
[58] Field of Search .................................. 318/9, 15, 630, 318/362, 363

[56] References Cited

U.S. PATENT DOCUMENTS

| | | | |
|---|---|---|---|
| 4,454,428 | 6/1984 | Kimmel et al. | 290/40 R |
| 4,465,162 | 8/1984 | Yokota | 187/277 |
| 5,111,707 | 5/1992 | Sugiyama | 74/7 E |

FOREIGN PATENT DOCUMENTS 4-304506  10/1992  Japan .

*Primary Examiner*—Bentsu Ro
*Attorney, Agent, or Firm*—Brinks Hofer Gilson & Lione

[57] ABSTRACT

According to the invention, when directed to slow down a driven device, the speed of a driving motor is reduced from a first speed to a slower second speed. In this state, a driving gear continues to rotate at said second speed, whereas a driven gear continues to rotate by inertia and gradually slows down from said first speed. Thus, the rear of a cog of the driven gear is separated from the front of a cog of the driving gear. When the speed of the driven gear is equal to the second speed, i.e., the speed of the driving gear, the front of another cog of the driven gear reaches the rear of said cog of the driving gear. Accordingly, both gears lightly make contact. Thereafter, the driving motor is rapidly braked by maintaining the contact of the driving gear and driven gear such that both gears slow down and stop.

When slowing down a driven device, noise generated by the impact of both gears is reduced as much as possible, and the time for slowing down a driven device is reduced.

15 Claims, 8 Drawing Sheets

FIG.11

| PULSE RATE [PPS] | TIME [msec] | TOTAL [msec] | |
|---|---|---|---|
| 2173.91 (V1) | 0.46 | 0 | ← F |
| 2083.33 (V2) | 0.48 | 0.48 | |
| 2083.33 (V2) | 0.48 | 0.96 | |
| 2083.33 (V2) | 0.48 | 1.44 | |
| 2083.33 (V2) | 0.48 | 1.92 | |
| 2083.33 (V2) | 0.48 | 2.40 | |
| 2083.33 (V2) | 0.48 | 2.88 | |
| 2083.33 (V2) | 0.48 | 3.36 | |
| 2000.00 | 0.50 | 3.86 | ← G2 |
| 1923.08 | 0.52 | 4.38 | |
| 1851.85 | 0.54 | 4.92 | |
| 1785.71 | 0.56 | 5.48 | |
| 1666.67 | 0.60 | 6.08 | |
| 1562.50 | 0.64 | 6.72 | |
| 1428.57 | 0.70 | 7.42 | ← G3 |
| 1250.00 | 0.80 | 8.22 | |
| 1000.00 | 1.00 | 9.22 | |
| 724.64 | 1.38 | 10.66 | |
| 396.83 | 2.52 | 13.12 | |
| | | | ← H |

APPARATUS AND METHOD FOR CONTROLLING A DRIVING MOTOR

BACKGROUND OF THE INVENTION

1. Field of the Invention

The present invention relates to an apparatus and method for controlling a driving motor, and specifically relates to an apparatus and method for controlling a driving motor which drives a driven device by a gear system.

2. Description of the Related Art

FIG. 1 briefly shows the construction of a typical driving device for driving a driven device. FIG. 2 is a section view of the device of FIG. 1 viewed from line VIII—VIII.

Driving gear 55, which is a flat gear, is connected to the tip of drive shaft 53 of driving motor 51 controlled by controller 57. On the other hand, driven gear 63, which is a flat gear, is connected to the tip of driven shaft 61 of driven device 59. Driving gear 55 and driven gear 63 are mutually engaged, such that the drive force of driving motor 51 is transmitted to driven device 59. As shown in FIG. 2, cog 65a of driving gear 55 makes contact with cog 67a of driven gear 63, but cog 65b and cog 67a do not make contact via a backlash. The backlash is the clearance between cog surfaces and is provided to allow smooth rotation of the gears.

FIG. 3 shows the types of patterns of stopping controls executed by controller 57 of driving motor 51 shown in FIG. 1.

FIG. 3(A) shows a control pattern when the speed of a driving motor is stopped directly from a stationary speed in time t at which a stop command for a driven device is output.

FIG. 3(B) shows a control pattern when the speed of a driving motor is linearly slowed down from a stationary speed in time t.

FIG. 3(C) shows a control pattern when the speed of a driving motor naturally slows down in conjunction with the rotational inertias of the driving gear and the driven gear in time t with the driving motor current switched OFF.

Various disadvantages arise in the aforesaid stopping controls of a driving motor.

In the control shown in FIG. 3(A), loud impact noise is produced during stopping because the driven device is stopped in a short time. FIG. 4 illustrates impact reduction in such an instance, and corresponds to the gear linkage state shown in FIG. 2.

From the state shown in FIG. 2, the driving motor speed becomes zero [0] at time t according to the control pattern of FIG. 3(A) to abruptly stop driving gear 55. Since a backlash is provided for both gears and driven gear 63 which is driven up to that time is not directly stopped by rotational inertia, cog 67a of driven gear 63 continues to rotate in a counterclockwise direction until contact is made with cog 65b of stopped driving gear 55, as shown in FIG. 4. Thus, a loud noise is produced by the impact of cogs 67a and 65b. Impacted cog 67a is reversely rotated in a clockwise direction by the reaction of the impact with cog 65b so as to again abut cog 65a, and the rotational vibration of gear 63 is repeated so as to again contact cog 65a, thereby readily producing a noise source. Although the aforesaid disadvantage can be avoided if the clearance of the cogs, i.e., backlash, is eliminated, a backlash is a mechanical necessity for gear systems.

On the other hand, comparison of the control which linearly slows down the speed of the motor such as shown in FIG. 3(B) and the natural stopping control through rotational inertia such as shown in FIG. 3(C) shows that gear 55 is not stopped abruptly. Although these stopping methods are advantageous in reducing noise generated by the impact of driven gear 63, they are disadvantageous in that a long time is required to completely stop the driven device.

When control is implemented to accelerate the stopping control to produce an abrupt drop in the speed of the driving motor as shown in FIG. 5 so as to stop a driven device within the time restriction allowed to stop the driven device, a disadvantage similar to that produced by the control pattern of FIG. 3(A) occurs, i.e., loud noise is generated. In recent years, the problem of noise in office automation equipment has not been adequately addressed relative to driving control of a driven device in the complex repetition of stopping controls.

An object of the present invention is to eliminate the previously described disadvantages by providing a control device for a driving motor capable of reducing as much as possible the noise generated by the impact of gears, and slowing down the speed or stopping a driven device in a short time when reducing the speed or stopping a driven device.

SUMMARY OF THE INVENTION

The apparatus and method for controlling a driving motor of the present invention comprises a driving motor which turns at a predetermined first speed, a first gear engaged with said driving motor, and a second gear, engaged with said first gear with a backlash, for transmitting driving power to a driven device. When slowdown of the driving speed of a driven device is directed, the driving motor is slowed to a second speed slower than the aforesaid first speed for a predetermined time after said slowdown, and when the slowdown operation is completed, the driving motor is a rapidly braked.

According to the present invention, when directed to slow down a driven device, the rear portion of said second gear separates from the front portion of said first gear via the slowdown operation, and after a predetermined period, the front portion of another cog of said second gear reaches the rear of a cog of said first gear. At this time, the impact between the first gear and the second gear is extremely light, such that noise produce by said impact is reduced. Furthermore, because the driving motor is braked after a predetermined slowdown period, the speed of the driven device can be slowed down in a short time.

Other objects and advantages of the present invention will become apparent from the detailed description to follow taken in conjunction with the appended claims.

BRIEF DESCRIPTION OF THE DRAWINGS

FIG. 11 shows the specific content of the stopping control of a driving motor.

DETAILED DESCRIPTION OF THE PREFERRED EMBODIMENTS

Figure 6:
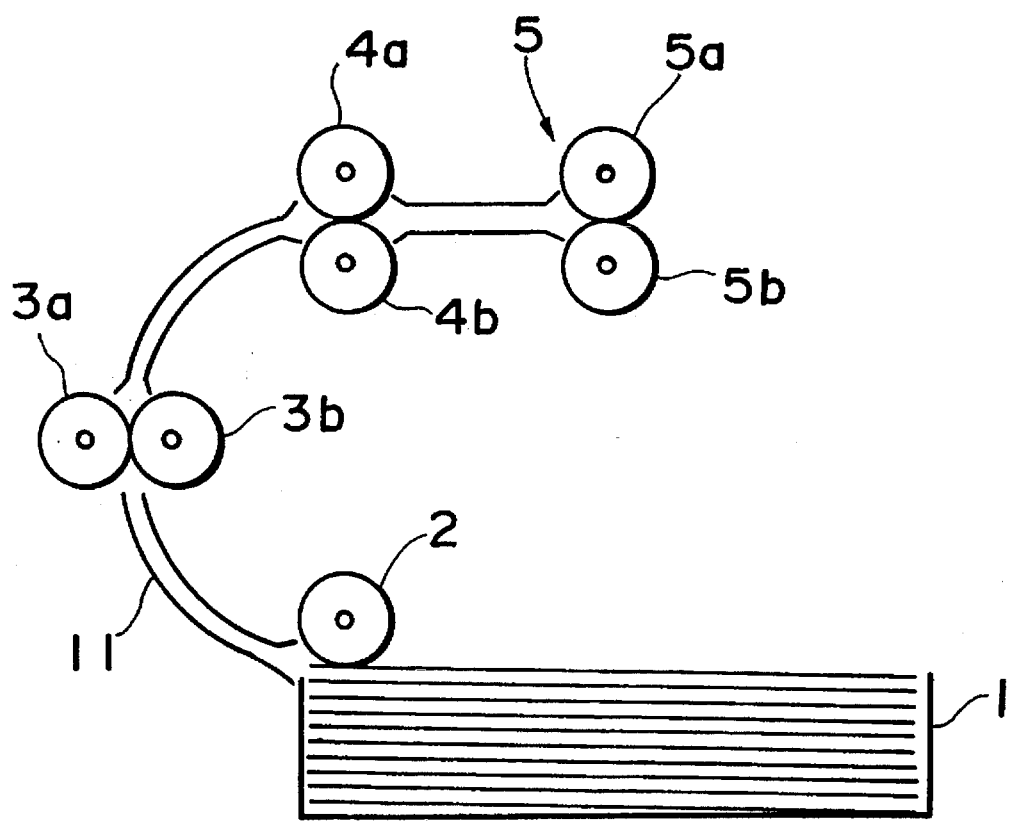
FIG. 6 briefly shows the construction of a sheet feeding device used in copying apparatus and the like employing an embodiment of the present invention.

FIG. 6 briefly shows the construction of a sheet feeding device used in a copying apparatus, facsimile or the like employing an embodiment of the present invention.

Referring to the drawing, sheets stacked in cassette 1 are fed sequentially one sheet at a time by feed roller 2 provided above cassette 1. A sheet fed by feed roller 2 is guided by guide panel 11, gripped at the nip between feed roller pair 3a and 3b and pair 4a and 4b, and transported to the nip of timing roller pair 5. Timing roller pair 5 comprises a top roller 5a and a bottom roller 5b; bottom roller 5b is driven by a drive motor (not illustrated) the speed of which is controllable.

Timing roller pair 5 is in a stopped state when a sheet is introduced therebetween, and the leading edge of a sheet transported by transport roller pair 4a and 4b abuts the nip of timing roller pair 5 so as to form a loop. Thereafter, timing roller pair 5 is driven in rotation with a suitable timing synchronously with a subsequent transport device (not illustrated), such that a sheet is advanced to said subsequent transport device.

Figure 1:
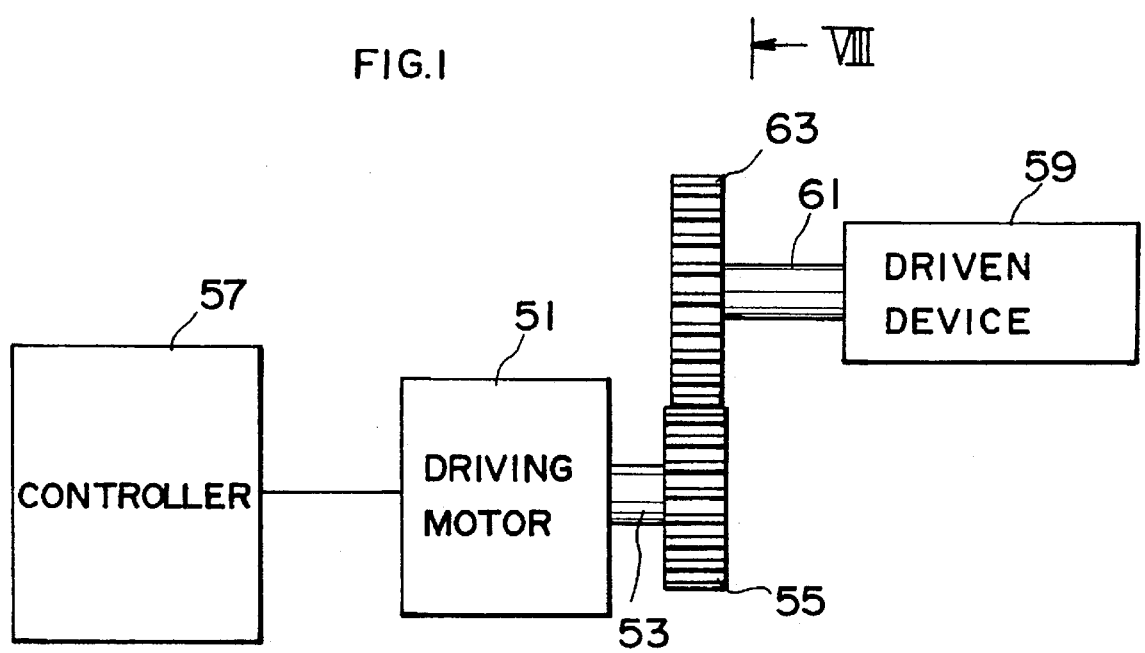
FIG. 1 briefly shows the construction of a typical driving apparatus for driving a driven device.
Figure 7:
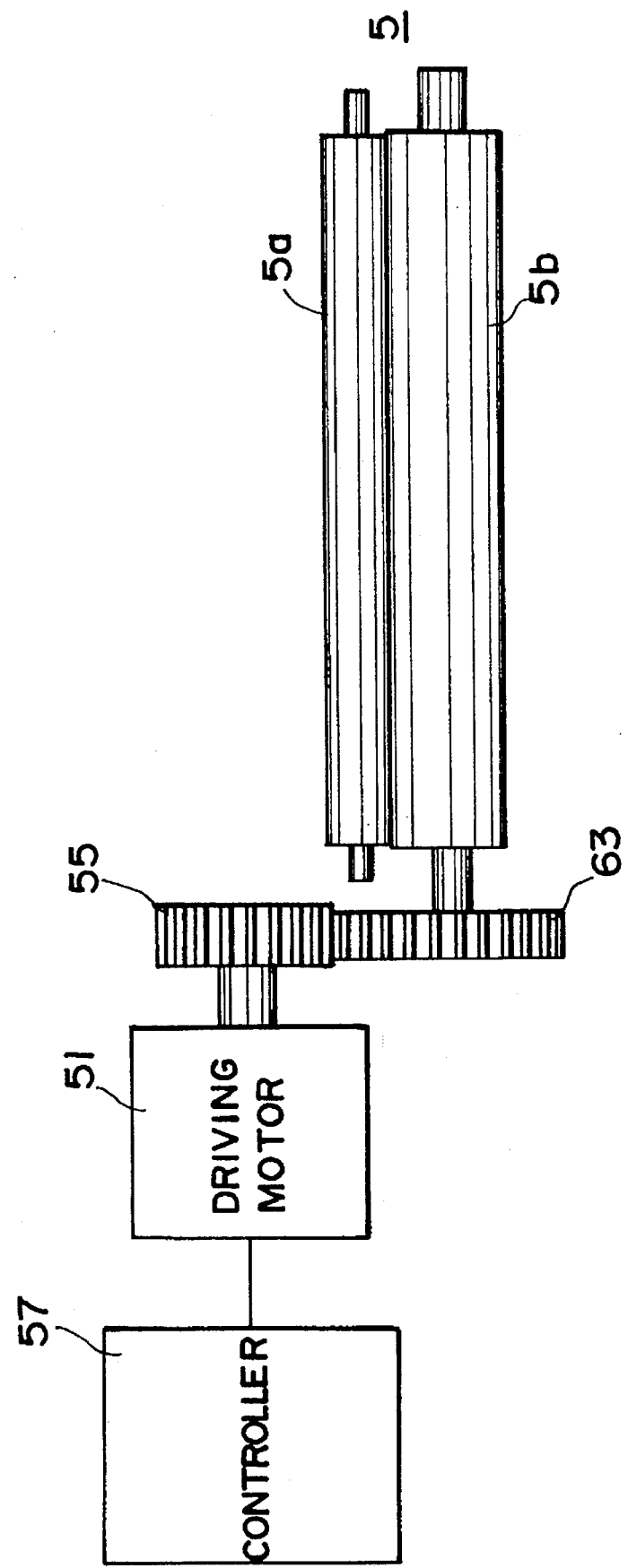
FIG. 7 shows a specific drive mechanism comprising a pair of transport rollers.

FIG. 7 shows the specific drive mechanism of transport roller pair 5a and 5b of FIG. 6, and corresponds to the construction of FIG. 1 of a conventional apparatus.

Referring to the drawings, driving gear 55 is connected to driving motor 51 controlled by controller 57. On the other hand, roller pair 5 comprising roller 5a and roller 5b are arranged so as to face one another, and roller 5b is connected to driven gear 63 engaged with driving gear 55 as a driven roller.

Although timing roller pair 5 is repeatedly stopped and rotated through the control executed by controller 57 to sequentially transport sheets advanced thereto onward to a subsequent transport device, said roller pair 5 must be stopped after completely advancing a sheet being transported until a next sheet arrives by transport roller pair 4a and 4b due to the timing for feeding a subsequent sheet.

Figure 8:
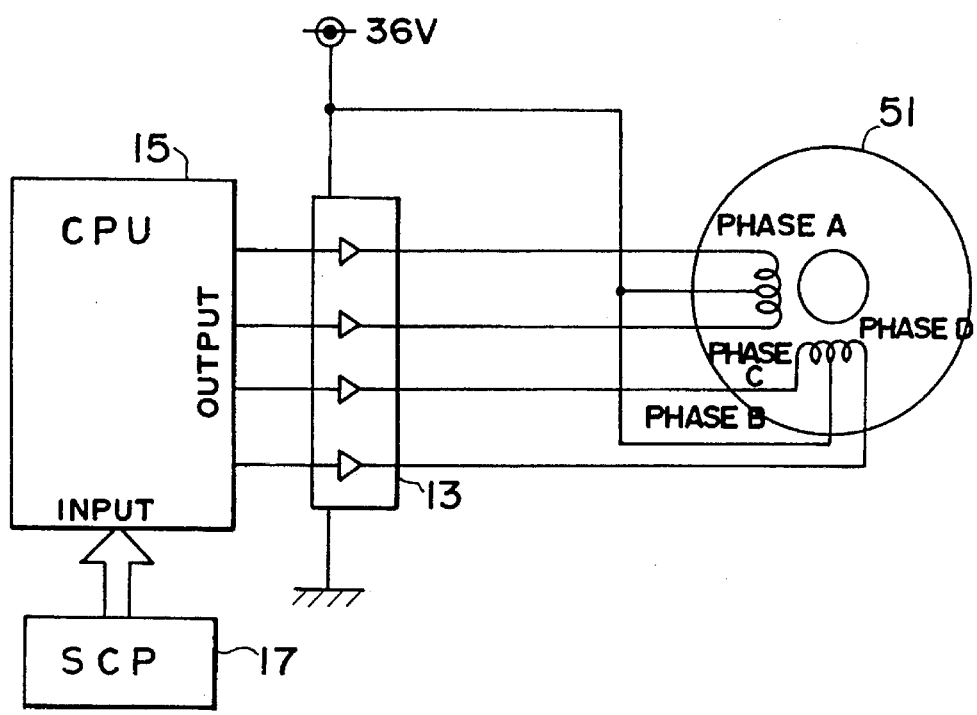
FIG. 8 is a block diagram briefly showing the construction of a control circuit of the drive motor of FIG. 7.

FIG. 8 is a block diagram briefly showing the construction of the control circuit of driving motor 51, i.e., the stepping motor of FIG. 7.

Referring to the drawing, the fixed side coil of stepping motor 51 has four poles labeled phase A, phase B, phase C, and phase D. Signals are output from the output ports of microcomputer 15 comprising a central processing unit (CPU) through driver circuit 13 to the aforesaid poles. REM signals from SCP 17 are transmitted to the input port of microcomputer 15. SCP is defined as a CPU for controlling the optical system such as a scanner and the like, and REM signals are defined as signals output to synchronize the transport system for reading via a scanner or the like. Data for driving stepping motor 51 are stored in microcomputer 15, and microcomputer 15 drives stepping motor 51 using the stored data in conjunction with stored programs.

Figure 9:
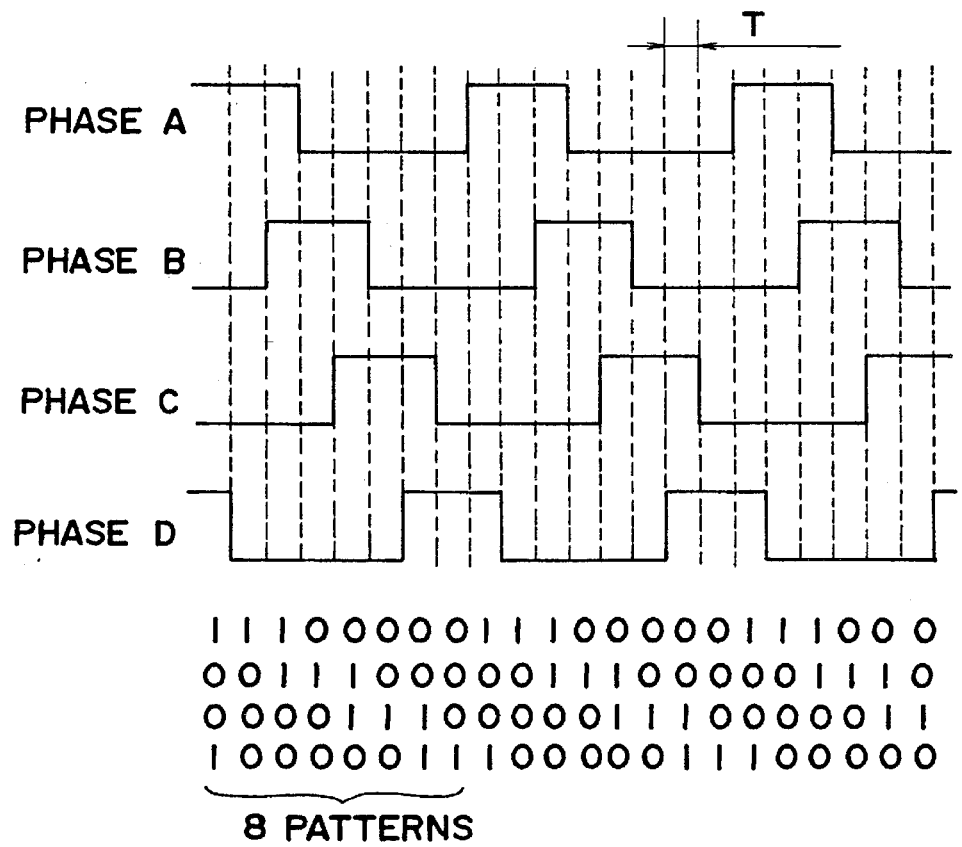
FIG. 9 is a current waveform diagram at stationary speed control in the 1-2 phase excitation method of the control circuit of stepping motor 51 of FIG. 8.

FIG. 9 is a current waveform diagram at stationary speed control in the 1-2 phase excitation method of the control circuit of stepping motor 51 of FIG. 8.

Referring to the drawing, the horizontal axis represents the time and the change in input current for each phase is shown. When the high level signal is designated [1] and the low level signal is designated [0], eight input patterns of 12 phase excitation are stored in the CPU of microcomputer 15, and microcomputer 15 repeats these signals and transmits them to stepping motor 51. Although the above description has been in terms of stationary speed control, microcomputer 15 transmits predetermined signals to stepping motor 51 during slowdown control described below. Slowdown control changes the pulse rate by log curve. The pulse rate is defined as the number of pulses per second, e.g., when 200 pulses are generated during a one second interval, the pulse rate is expressed as 200 pps.

Figure 10:
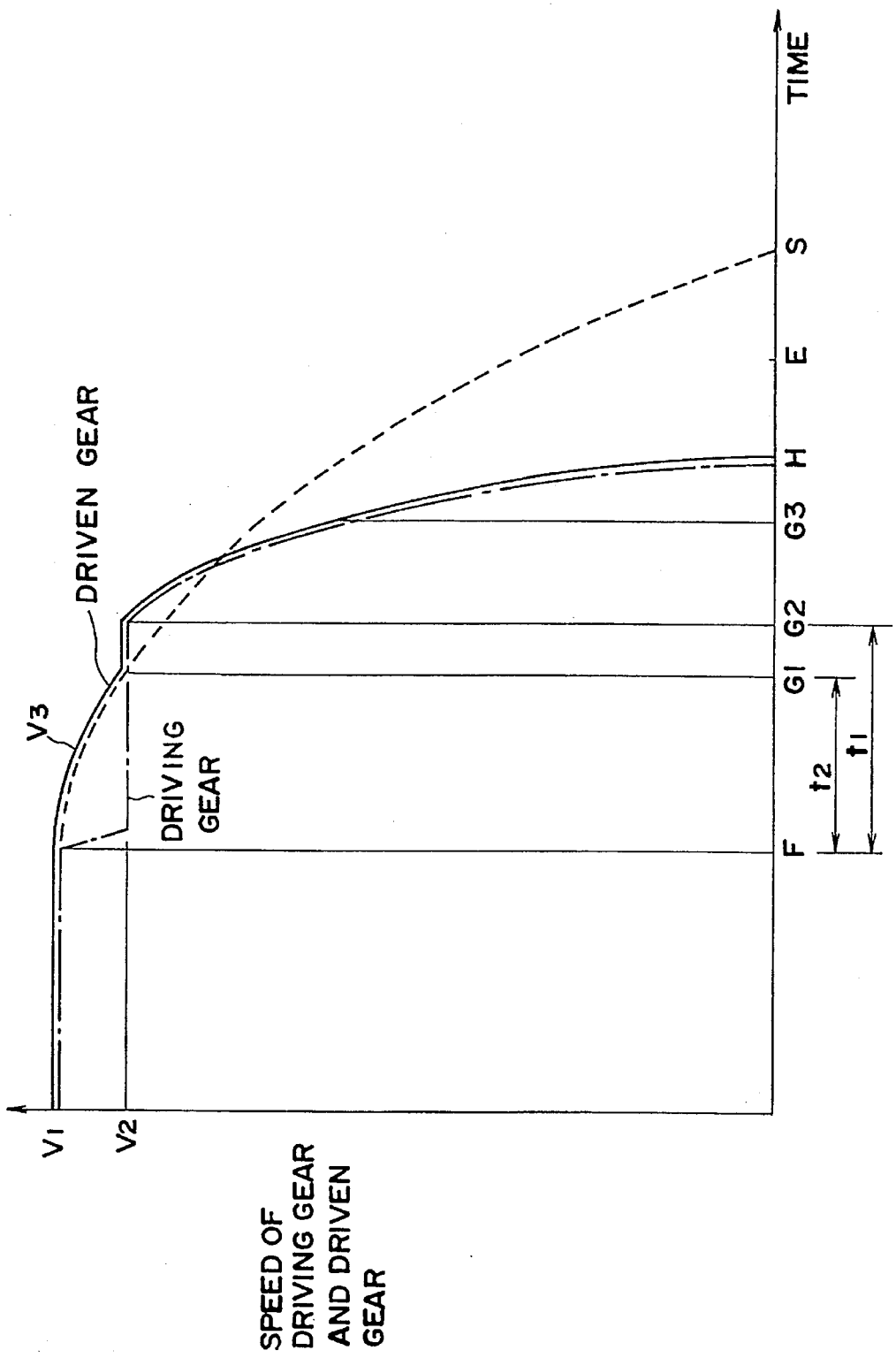
FIG. 10 shows the changes in the speed of the driving gear and the driven gear during the slowdown control of the driving motor of FIG. 7.

FIG. 10 shows the changes in the speed of the driving gear 55 and the driven gear 63 during the slowdown control of the driving motor of FIG. 7, and FIG. 11 shows the specific content of the stopping control of a driving motor.

Figure 3A:
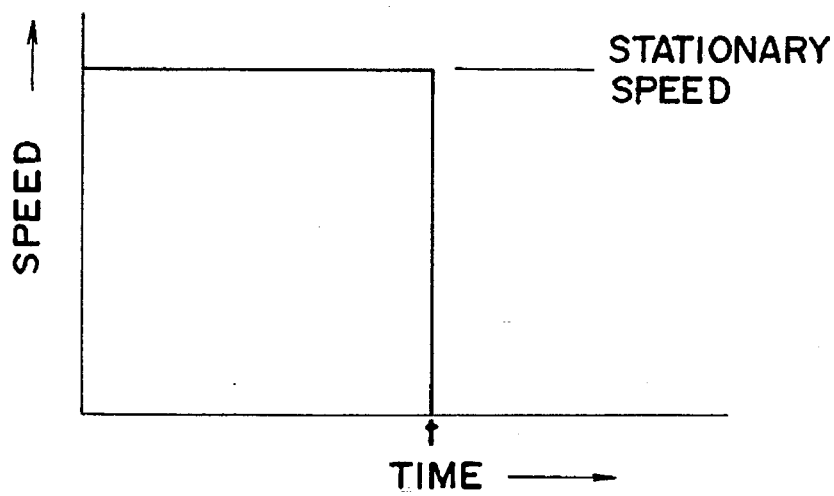
FIG. 3(A) shows an example of stopping control via an apparatus for controlling the driving motor shown in FIG. 1.
Figure 3B:
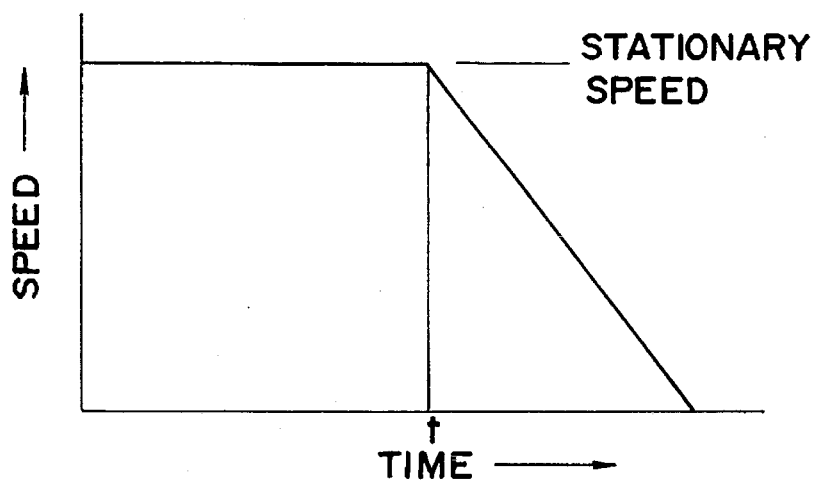
FIG. 3(B) shows another example of stopping control via an apparatus for controlling the driving motor shown in FIG. 1.
Figure 3C:
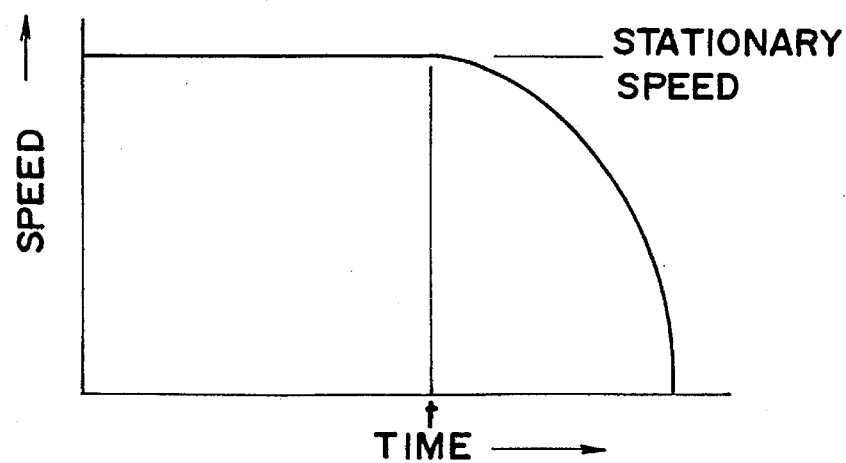
FIG. 3(C) shows still another example of stopping control via an apparatus for controlling the driving motor shown in FIG. 1.

In the drawing, the dashed line corresponds to the control pattern of FIG. 3(C) of a conventional control. Specifically, at the slowdown starting point F, the driving current of the driving motor is switched OFF and the driving motor continues to turn by rotational inertia, until the driven gear slows down and stops, as shown in the illustration. As previously described, noise can be reduced during stopping control, but the time required from the start of slowdown until complete stop is lengthened, such that when a subsequent drive start command is generated at point E, the command is missed.

Slowdown control is accomplished in the present embodiment based on the present of the invention. In the drawing, dot-dash line represents the change over time of the driving gear speed, and the solid line represents the change over time of the driven gear speed.

Figure 2:
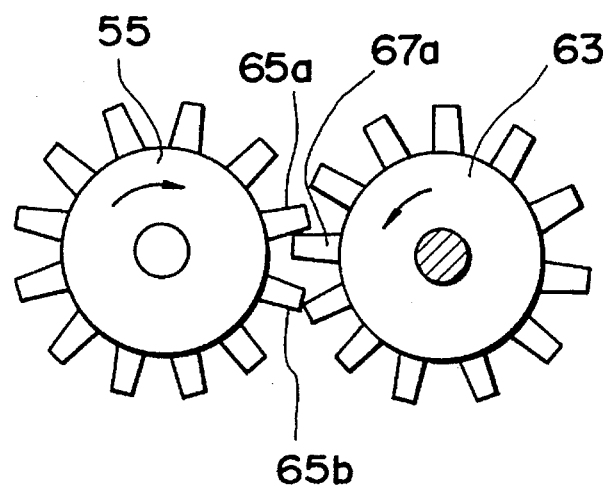
FIG. 2 is a section view on the VIII—VIII line of FIG. 1.
Figure 4:
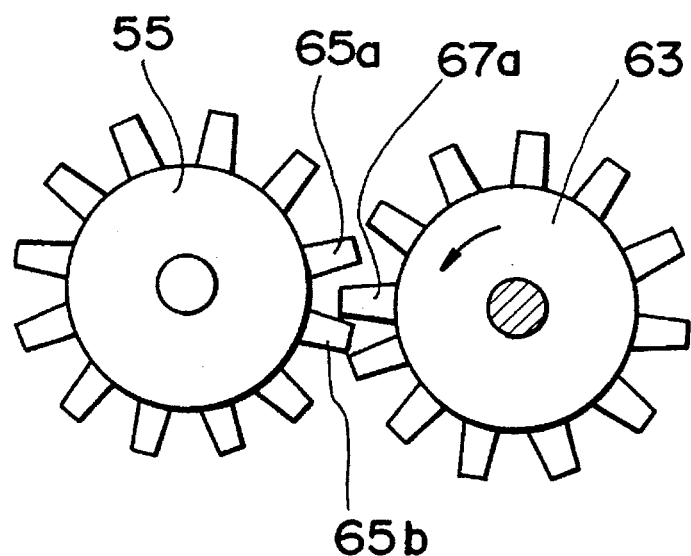
FIG. 4 corresponds to FIG. 2, and shows the state of gears during gear slowdown control.
Figure 5:
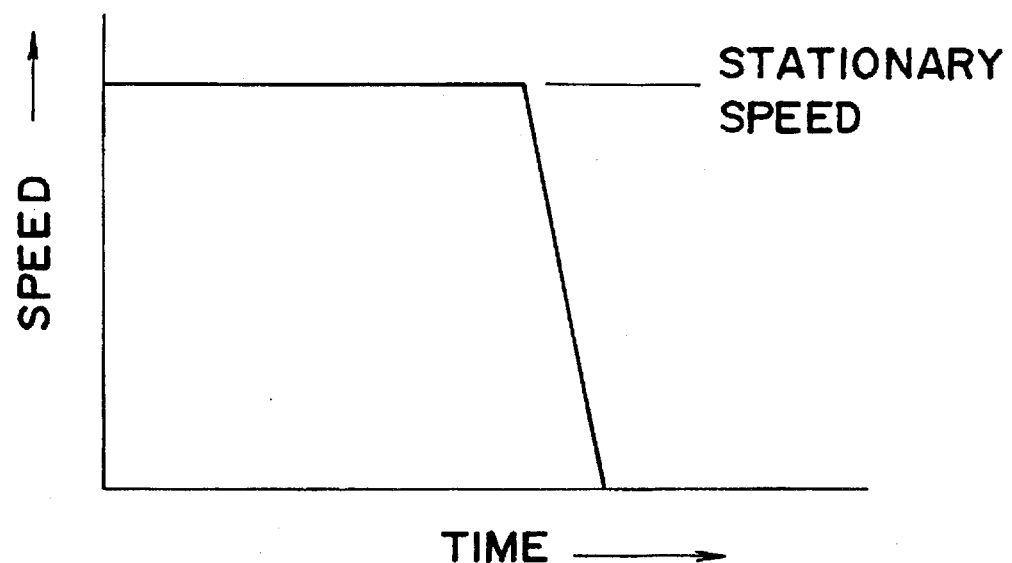
FIG. 5 shows another example of stopping control of the apparatus controlling the driving motor of FIG. 1.

When a stop command is received, the driving gear switches from stationary driving speed V1 (pulse rate: 2173.91), to driving speed V2 (pulse rate: 2083.33) to reduce the driving speed of the driving motor about 4% less than driving speed V1. On the other hand, the speed V3 of the driven gear is gradually reduced by inertia as indicated by the dashed line. Speed V3 drops until time G1 at which point speed V3 coincides with speed V2 of the driven gear, such that the cogs of driving gear 55 and driven gear 63 turn while in a state of mutual noncontact. In FIG. 2, the speed of driving gear 55 is less than the speed of driven gear 63, such that the contact between cogs 65a and 67a is released. As shown in FIG. 4, at time G1 cog 67a of driven gear 63 which is slowing down by inertia lightly impacts cog 65b of driving gear 55 rotating at speed V2, thereby producing a slight shock which generates noise and vibration, and after which driving gear 55 and driven gear 63 turn at the same speed V2. The aforesaid impact cannot be avoided insofar as a backlash is provided in the engagement of the gears and, therefore, noise and vibration are generated, but because there is only a slight difference between speeds V3 and V2, the impact of both gears at time G1 is diminished so as to reduce the noise and vibration.

When the driven gear speed V3 is about equal to the driving gear speed V1, there noise and vibration reduction is effective if speed V2 is 10% less than speed V1, and the noise and vibration reduction is even more effective if speed V2 is 7% less than speed V1.

The aforesaid driving motor is operated after slowdown starting time F for a predetermined time t1 (F→G2) at speed V2 which is slower than the low speed V1 (10% less is sufficient, and 7% less is preferable), and thereafter braking control (G2→H) is executed to rapidly reduce speed.

In principle, if time t1 is equal to time t2 required from the start of slowdown until impact between the driving gear slowed down to speed V2 and the driven gear turning by inertia (F→G1), the impact of both gears can be reduced, and noise and vibration can be diminished from time G1 until stopping time H. Actually, however, various fluctuations occur including dispersion in driving motor drive characteristics/response (stepping motor dispersion is slight, but dispersion readily occurs in DC motors pulse width modulation (PWM) control over coarse intervals), dispersion of inertial turning characteristics of rollers rotated by the driven gear, and fluctuation in the operating environment. Since dispersion of the rotation characteristics of a driven device is about 15%, dispersion of the time required until impact of the gears is estimated to be about 10% when other dispersions are considered. Thus, when time t1 of one type of device is set at t2 based on the t2 of another type of device, there is concern that abrupt braking may occur in time G2→H before impact of the gears in the former device. The actual shock of the impact increases, and vibration and noise increase at the time of impact and thereafter. Accordingly, time t1 during which speed V2 is maintained must actually be equal to or longer than time t2 from the start of slowdown until impact between the gears.

In consideration of the aforesaid information, the time t2 for maintaining speed V2 of a particular type of device was experimentally determined, and it was discovered that the aforesaid problems were eliminated when time t1, during which the driving gear operates at speed V2 after the start of slowdown, is set at t1=t2×1.1, in the present embodiment. Thus, in the present embodiment, time t1 provides a 10% margin relative to time t2, such that when the speed dispersion is slight, the margin may be small, and when there is virtually no speed dispersion, times t1 and t2 may be equal. This margin may be 5% or higher to improve reliability of the device, and a margin of 10% or more is preferred from the perspective of reliability.

As previously described, the shock of impact is diminished by controlling the driving motor during time F→G2, thereby reducing noise and vibration at time G1 and time G2→H. Furthermore, braking control at time G2 makes the entire slowdown time F→H shorter than natural slowdown as indicated by the dash line in FIG. 10 or linear slowdown shown in FIG. 3(B). Therefore, the method of the present invention is particularly useful in the case of short control intervals slowdown→drive stop→drive start, and in the case of driving devices having a large stationary speed V1.

In the slowdown control data examples shown in FIG. 11, PPS (driving speed) is expressed for various times, and after operation at constant sped V1 (2173.91 pps), the operation is at speed V2 (2080.33 pps) from slowdown starting timer F during time F→G2, and slowdown occurs after time G2.

In the present embodiment, the driving speed, i.e., the pulse rate, is constant during time F→G2. If the speed relationship is expressed as $V1>V2 \geq V1\times(1-0.10)$, speed V2 may be variable.

In the control during time G2→H, the pulse rate is set so as to slowdown by log interpolation curve to achieve smooth deceleration during time G2→G3, and during time G3→H, the pulse rate is controlled so as to achieve rapid deceleration.

Although the present embodiment has been described in terms of a stepping motor, it is to be noted that a DC motor may be used. Specifically, a PWM load may be set to achieve the aforesaid speed V2 and the brake may be turned ON during time G2 without a regenerative brake or electromagnetic brake at the start of slowdown as indicated by conventional control patterns. Although weak braking during time F→G2 accomplished by a separate installation was considered, it is more desirable that control be accomplished by the driving of the motor itself as in the present embodiment because provision of a separate brake would increase costs and braking characteristics would be unstable.

Although the present embodiment has been described in terms of a driving gear mounted on a drive shaft of a driving motor engaged with a driven gear of a driven device, it is to be understood that intermediate gears may be interposed between said driving gear and said driven gear, and the total backlash between the various gears may be considered as the backlash between the driving gear and the driven gear of the previously described embodiment.

What is claimed is:

1. An apparatus for controlling a driving motor comprising:

a driving motor which turns at a predetermined first speed;

a first gear engaged with said driving motor;

a second gear, engaged with said first gear with a backlash, for transmitting a driving power to a driven device;

a directing device for directing the slowing down of the driving speed of the driven device;

a slowdown device for changing the speed of said driving motor from the first speed to a slower second speed in response to the output of said directing device;

a waiting device for waiting for a predetermined period after the slowdown operation of said slowdown device with keeping the second speed, and a brake device for braking the driving motor rapidly after said waiting device waits for the predetermined period.

2. The apparatus according to claim 1, wherein said waiting device waits from the time the rear of a cog of said second gear leaves the front of a cog of said first gear by said slowdown operation until the front of another cog of said second gear reaches the rear of said cog of said first gear.

3. The apparatus according to claim 2, wherein said waiting device waits a further predetermined period after the front of another cog of said second gear reaches the rear of said cog of said first gear.

4. The apparatus according to claim 1, wherein said waiting device waits while said second gear slows down from said first speed to said second speed.

5. The apparatus according to claim 1, wherein the difference between the first speed and the second speed is within 10 percent of the first speed.

6. The apparatus according to claim 5, wherein the difference between the first speed and the second speed is within 7 percent of the first speed.

7. The apparatus according to claim 1, wherein said driving motor is a stepping motor and said slowdown device and said brake device control the number of pulses per second of applying voltage to the driving motor.

8. A method for controlling a driving motor whose driving power is transmitted to a driven device through a mechanism composed by at least two gears, said method comprising:

the step of engaging a first gear with the driving motor;

the step of engaging a second gear with the first gear with a backlash;

the step of turning the driving motor at a predetermined first speed;

the step of directing the slowing down the driving speed of the driven device;

the step of changing a speed of the driving motor from the first speed to a slower second speed in response to the direction to slow down;

the step of waiting for a predetermined period after the slowdown operation while maintaining the second speed; and the step of braking the driving motor rapidly after the step of waiting for a predetermined period.

9. The method according to claim 8, wherein said step of waiting comprises the step of waiting from the time the rear of a cog of said second gear leaves the front of a cog of said first gear by said slowdown operation until the front of another cog of said second gear reaches the rear of said cog of said first gear.

10. The method according to claim 9, wherein said step of waiting comprises the step of waiting further predetermined period after the front of another cog of said second gear reaches the rear of said cog of said first gear.

11. The method according to claim 8, wherein said step of waiting comprises the step of waiting while said second gear slows down from said first speed to said second speed.

12. The method according to claim 8, wherein the difference between the first speed and the second speed is within 10 percent of the first speed.

13. The method according to claim 12, wherein the difference between the first speed and the second speed is within 7 percent of the first speed.

14. The method according to claim 8, wherein said driving motor is a stepping motor and said step of slowing down and said step of braking comprise the step of controlling the number of pulses per second of applying voltage to the driving motor.

15. A controlling apparatus of a driving motor comprising:

a driving motor which turns at a predetermined speed;

a first gear engaged with said driving motor;

a second gear, engaged with said first gear with a backlash, for transmitting a driving power to a driven device;

a directing device for directing the slowing down of the driving speed of the driven device; and a controller for slowing down the speed of said driving motor in response to the output of said directing device so that the rear of a cog of said second gear may leave the front of a cog of said first gear and for braking the driving motor rapidly after the front of another cog of said second gear reaches the rear of said cog of said first gear.

* * * * *